(12) United States Patent
Hajati et al.

(10) Patent No.: US 11,719,947 B1
(45) Date of Patent: Aug. 8, 2023

(54) PRISM BEAM EXPANDER

(71) Applicant: Apple Inc., Cupertino, CA (US)

(72) Inventors: Arman Hajati, San Mateo, CA (US); Eric J. Hansotte, Morgan Hill, CA (US); Robert S. Upton, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 101 days.

(21) Appl. No.: 16/871,063

(22) Filed: May 11, 2020

Related U.S. Application Data (60) Provisional application No. 62/868,933, filed on Jun. 30, 2019.

(51) Int. Cl.
| | | |
|---|---|---|
| *G02B 27/10* | (2006.01) | |
| *G02B 27/09* | (2006.01) | |
| *B23K 26/073* | (2006.01) | |

(52) U.S. Cl.
CPC ...... *G02B 27/0983* (2013.01); *B23K 26/0732* (2013.01); *G02B 27/0927* (2013.01)

(58) Field of Classification Search
CPC ............ G02B 27/0972; G02B 27/0977; G02B 27/106; G02B 27/145
See application file for complete search history.

(56) References Cited

U.S. PATENT DOCUMENTS

| | | | |
|---|---|---|---|
| 4,084,883 A | 4/1978 | Eastman et al. | |
| 5,076,664 A | 12/1991 | Migozzi | |
| 6,577,411 B1 | 6/2003 | David | |
| 6,798,579 B2 | 9/2004 | Robinson et al. | |
| 6,829,095 B2 | 12/2004 | Amitai | |
| 7,613,373 B1 | 11/2009 | DeJong | |
| 8,237,760 B2 | 8/2012 | Nihei et al. | |
| 8,976,363 B2 | 3/2015 | Bendall et al. | |
| 9,025,253 B2 | 5/2015 | Hadad et al. | |
| 9,297,996 B2 | 3/2016 | Bohn et al. | |
| 9,329,080 B2 | 5/2016 | Shpunt et al. | |
| 10,003,168 B1 | 6/2018 | Villeneuve | |
| 10,488,746 B2 | 11/2019 | Pertierra et al. | |
| 2003/0011751 A1 | 1/2003 | Sakata et al. | |
| 2006/0221022 A1 | 5/2006 | Hajjar | |
| 2007/0153866 A1 | 7/2007 | Shchegrov et al. | |
| 2007/0159673 A1 | 7/2007 | Freeman et al. | |
| 2011/0134017 A1 | 6/2011 | Burke | |
| 2012/0062850 A1 | 3/2012 | Travis | |

(Continued)

FOREIGN PATENT DOCUMENTS

EP   3550329 A1   10/2019

OTHER PUBLICATIONS

U.S. Appl. No. 16/871,068 Office Action dated May 13, 2021.

(Continued)

*Primary Examiner* — Joseph P Martinez
(74) *Attorney, Agent, or Firm* — Kligler & Associates Patent Attorneys Ltd (57) ABSTRACT

An optical component includes a block of a transparent material, having a trapezoidal cross-section defined by first and second parallel, rectangular faces on mutually-opposing sides of the block and third and fourth faces oriented diagonally at opposing ends of the first and second faces. One or more planar, partially-reflecting layers extend within the block between the third and fourth faces in an orientation parallel to the first and second faces.

20 Claims, 6 Drawing Sheets

(56) References Cited

U.S. PATENT DOCUMENTS

| | | |
|---|---|---|
| 2014/0146394 A1 | 5/2014 | Tout et al. |
| 2016/0341964 A1* | 11/2016 | Amitai .................... G06F 3/16 |
| 2017/0176596 A1 | 6/2017 | Shpunt et al. |
| 2018/0074316 A1 | 3/2018 | Burkhardt et al. |
| 2018/0081168 A1 | 3/2018 | Shpunt et al. |
| 2018/0120559 A1 | 5/2018 | Yeoh et al. |
| 2019/0094981 A1 | 3/2019 | Bradski et al. |
| 2019/0227319 A1 | 7/2019 | Trail et al. |
| 2019/0348585 A1 | 11/2019 | Woodgate et al. |
| 2019/0369405 A1 | 12/2019 | Chen et al. |
| 2020/0278538 A1 | 9/2020 | Taylor et al. |
| 2020/0348418 A1 | 11/2020 | Sutton et al. |

OTHER PUBLICATIONS

U.S. Appl. No. 17/134,569 Office Action dated Sep. 20, 2021.
Hajati et al., U.S. Appl. No. 16/871,069, filed May 11, 2020.
Hajati et al., U.S. Appl. No. 16/871,068, filed May 11, 2020.
U.S. Appl. No. 16/871,069 Office Action dated Oct. 7, 2022.

* cited by examiner

FIG. 6A  Efficiency = 100%

FIG. 6B  Efficiency = 100%

FIG. 6C  Efficiency = 100%

FIG. 6D  Efficiency = 81%

FIG. 6E  Efficiency = 75%

FIG. 6F  Efficiency = 67%

PRISM BEAM EXPANDER

CROSS-REFERENCE TO RELATED APPLICATION

This application claims the benefit of U.S. Provisional Patent Application 62/868,933, filed Jun. 30, 2019, which is incorporate herein by reference.

FIELD OF THE INVENTION

The present invention relates generally to optical components, and particularly to beam expanders and homogenizers.

BACKGROUND

Optical beam expanders for expanding and homogenizing a narrow input beam in one dimension are commonly required in optical apparatuses, such as certain types of projection systems. The expansion may be achieved by splitting and replicating the narrow input beam several times, and the homogenization is achieved by controlling the ratios into which the beam is split.

SUMMARY

Embodiments of the present invention provide improved optical components and systems, as well as methods for their manufacture and use.

There is therefore provided, in accordance with an embodiment of the invention, an optical component, including a block of a transparent material, having a trapezoidal cross-section defined by first and second parallel, rectangular faces on mutually-opposing sides of the block and third and fourth faces oriented diagonally at opposing ends of the first and second faces. One or more planar, partially-reflecting layers extend within the block between the third and fourth faces in an orientation parallel to the first and second faces.

In some embodiments, the trapezoidal cross-section includes a parallelogram. Alternatively, the trapezoidal cross-section includes an isosceles trapezoid.

In a disclosed embodiment, the optical component includes an anti-reflective coating on the third and fourth faces.

Typically, the first and second faces are configured to reflect internally rays of light that impinge on the first and second faces after passing through the partially-reflecting layers. In a disclosed embodiment, the optical component includes a reflective coating on the first and second faces.

In some embodiments, the one or more planar, partially-reflecting layers include multiple planar, partially-reflecting layers, which are parallel to and spaced apart between the first and second faces. In a disclosed embodiment, a spacing between the partially-reflecting layers does not exceed one-fifth of a length of the second face. Additionally or alternatively a height of the block between the first and second faces does not exceed one fifth of a length of the second face.

There is also provided, in accordance with an embodiment of the invention, image projection apparatus, including an optical pupil expander, which includes a block of a transparent material, having a trapezoidal cross-section defined by first and second parallel, rectangular faces on mutually-opposing sides of the block and third and fourth faces oriented diagonally at opposing ends of the first and second faces. One or more planar, partially-reflecting layers extend within the block between the third and fourth faces in an orientation parallel to the first and second faces. An image projector is configured to project a beam of light onto the third face of the block with a given input beam width, at an angle selected so that the beam is reflected internally within the block while being partially reflected and partially transmitted multiple times by the one or more planar, partially-reflecting layer, and exits through the fourth face with an output beam width at least twice the input beam width.

In some embodiments, the optical pupil expander is configured to homogenize an intensity of the light in the output beam.

Typically, the angle is selected so that the beam is reflected from the first and second faces of the block by total internal reflection.

There is additionally provided, in accordance with an embodiment of the invention, a method for image projection, which includes providing an optical pupil expander, including a block of a transparent material, having a trapezoidal cross-section defined by first and second parallel, rectangular faces on mutually-opposing sides of the block and third and fourth faces oriented diagonally at opposing ends of the first and second faces, with one or more planar, partially-reflecting layers extending within the block between the third and fourth faces in an orientation parallel to the first and second faces. A beam of light is projected onto the third face of the block with a given input beam width, at an angle selected so that the beam is reflected internally within the block while being partially reflected and partially transmitted multiple times by the one or more planar, partially-reflecting layer, and exits through the fourth face with an output beam width at least twice the input beam width.

In a disclosed embodiment, providing the optical pupil expander includes providing a plurality of sub-blocks of the transparent material, coating a surface of at least one of the sub-blocks with the one or more planar, partially-reflecting layers, and cementing the sub-blocks together to form the block of the transparent material.

The present invention will be more fully understood from the following detailed description of the embodiments thereof, taken together with the drawings in which:

DETAILED DESCRIPTION OF EMBODIMENTS

Overview

Optical beams that are expanded by a beam expander in one dimension often suffer from a low degree of homogenization, due to the design and structure of the expander. There is a need to achieve both a substantial beam expansion in one dimension and a high degree of homogenization of the expanded beam in order to satisfy the needs of applications such as in projection systems.

The embodiments of the present invention that are described herein address this need by means of an optical component functioning as a one-dimensional (1D) beam expander that expands an input beam through a large number of splits and reflections before emitting an expanded and homogenized exit beam. In the disclosed embodiments, the beam expander comprises a block of optically transparent dielectric material, such as glass, that transmits the majority of the optical power. This is accomplished in the wavelength range of interest, such as the visible range. (The terms "optical rays," "optical radiation," and "light," as used in the present description and in the claims, refer generally to any and all of visible, infrared, and ultraviolet radiation.)

The shape of the block is typically polyhedral, i.e., a three dimensional solid with flat polygonal faces. In the described embodiments, the shape of the block is hexahedral, but other suitable shapes may alternatively be used. Two opposing faces of the block, referred to as the first and second faces, are parallel to one another. The third and fourth faces of the block are oriented diagonally at opposing ends of the first and second faces. The beam expander comprises one or more planar, partially-reflecting layers extending within the block between the third and fourth faces in an orientation parallel to the first and second faces. In practice, the block is typically fabricated by coating component sub-blocks with thin-film coatings configured for partial reflection, and then cementing the component sub-blocks to each other to form the complete block with internal coatings.

The fifth and sixth faces, opposing each other, are generally parallel to each other and perpendicular to the other faces. However, the orientation of the fifth and sixth faces may deviate from the above in order to accommodate requirements such as mechanical mounting of the block. The numbering of the faces as first, second, and so on, is arbitrary and chosen for convenience only.

In some embodiments, the block has a trapezoidal cross-section, as defined by the first, second, third and fourth faces. The choice of a specific cross-section is dictated by the requirements for the angle of incidence and the angle of exit of the beams that are respectively incident to and emitted by the block. In one embodiment, the cross-section is an isosceles trapezoid, wherein the dihedral angle between the third face and the first face is equal to the dihedral angle between the fourth face and the first face. In another embodiment, the cross-section is a parallelogram, wherein the dihedral angle between the third face and the first face is supplementary to the dihedral angle between the fourth face and the first face, i.e., the sum of the two dihedral angles is 180 degrees. In this case, the block comprises a parallelepiped.

A narrow light beam is projected onto the third face, entering the block. ("Narrow" refers here to the diameter of the beam as compared to the lateral dimensions of the third face. Furthermore, in the present description the term "ray" is used to denote optical rays, and "beam" is used to denote an optical beam, which may be represented by a collection of rays.) The optical power contained in the rays is partially reflected and transmitted multiple times by the partially-reflecting layer or layers within the block, thus splitting each ray repeatedly. When the rays strike the first or second face, they are internally reflected within the block. By spacing the third and fourth faces substantially farther apart than the spacings between the partially-reflecting layers within the block, a large number of parallel rays are eventually generated and exit through the fourth face as an expanded beam. This expanded output beam extends across the fourth face with a transverse dimension that is much larger than the diameter of the input beam, for example with a width at least twice that of the input beam, and with roughly homogeneous intensity across the output beam. Thus, beam expansion is accomplished.

The first and second faces may be uncoated, when the internal angles of the beams within the block are beyond the critical angle for total internal reflection (TIR), or coated with a reflective coating, such as aluminum. The third and fourth faces may be coated by an anti-reflective coating in order to reduce reflection losses of the light entering into and exiting from the block.

System Description

Figure 1:
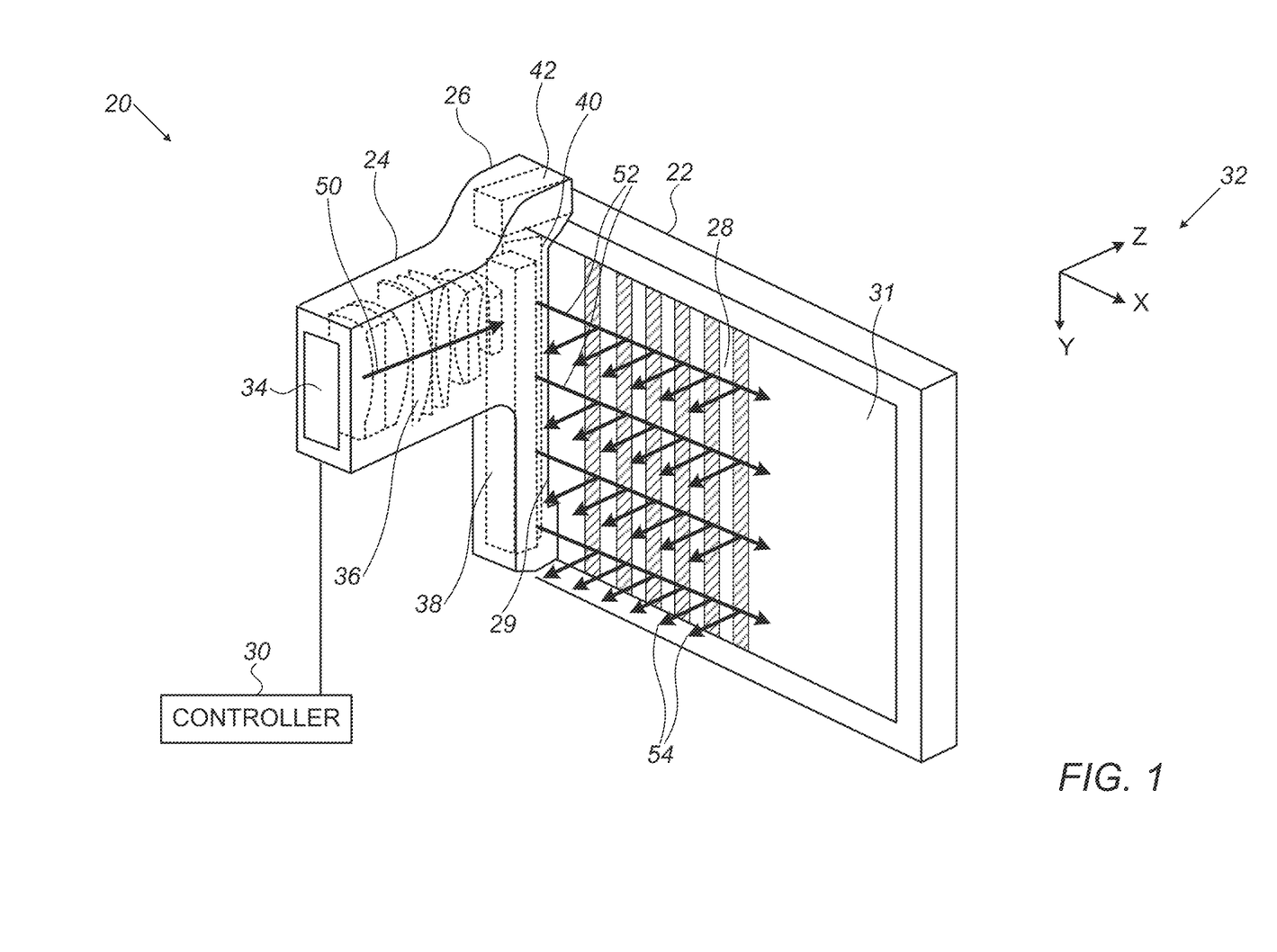
FIG. 1 is a schematic pictorial illustration of an image projection apparatus, in accordance with an embodiment of the invention.

FIG. 1 is a schematic pictorial illustration of an image projection apparatus 20, in accordance with an embodiment of the invention. Apparatus 20 may be used, for example, as part of a virtual reality (VR) or augmented reality (AR) system, as well as in other image projection applications. This apparatus is shown here as a non-limiting example of the use of a 1D beam expander as provided by embodiments of the present invention. Other uses of such a beam expander will be apparent to those skilled in the art after reading the present description and are considered to be within the scope of the invention.

Apparatus 20 is based on a typical format of eyeglasses. For the sake of simplicity, only the left side of apparatus 20 (as referenced to an observer wearing the system) is shown. The right side is a mirror image of the left side. Alternatively, the right side may comprise only a lens with or without optical power, but without a display.

Apparatus 20 comprises a suitably modified eyeglass frame 22, a 1D optical collimation assembly 24, a scanning mirror assembly 26, and a 1D pupil expander 28. A controller 30 is coupled to collimation assembly 24 and to scanning mirror assembly 26. Collimation assembly 24 comprises an emitter array 34, collimation optics 36, and a 1D beam expander 38. Collimation optics 36 are rotationally symmetrical and have their apertures shaped to form rectangles due to the narrow horizontal dimension of emitter array 34, which results in a narrow horizontal field-of-view. Emitter array 34 comprises, for example, an array of vertical-cavity surface-emitting lasers (VCSELs) or micro-light-emitting diodes (micro-LEDs), which emit respective beams toward optics 36.

Scanning mirror assembly 26 comprises an elongated rectangular first scanning mirror 40 and a mirror actuator 42, such as a galvanometer, with an axis of rotation of the scanning mirror assembly parallel to the Y-axis of a Cartesian coordinate system 32, corresponding to the vertical axis of the eyeglasses. (Cartesian coordinate system 32 is used for the sake of clarity and convenience only. Other coordinate systems may be alternatively used.) The dimensions of scanning mirror 40 are, for example, 20 mm×5 mm, wherein the long dimension, along the Y-axis, which is the axis of rotation, is determined by the dimension of pupil expander 28 in the Y-direction. Minimizing the short dimension (nominally along the X-direction), perpendicular to the axis of rotation, enables high-speed scanning and makes it possible to integrate assembly 26 unobtrusively into the eyeglass frame of apparatus 20. Alternatively, scanning mirror assembly 26 may comprise a long rotating polygon with an electric motor drive.

Pupil expander 28 comprises, for example, a waveguide, a surface grating, or a holographic element. Pupil expanders of these sorts are known in the art of AR displays, for example, and their details are beyond the scope of the present description.

Prism Designs

Figure 2:
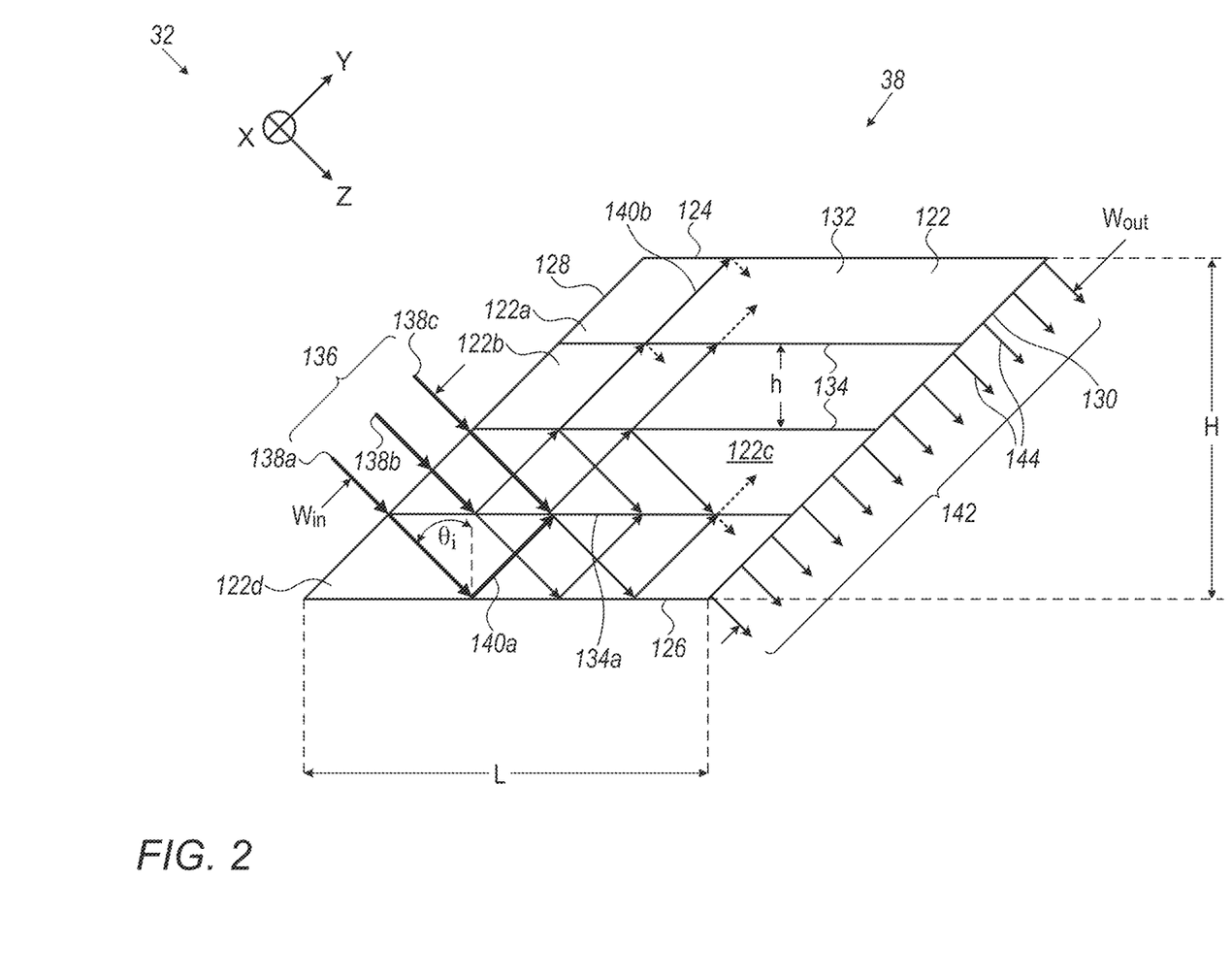
FIGS. 2, 3, 4 and 5 are schematic sectional views of beam expanders, in accordance with embodiments of the invention.

FIG. 2 is a schematic sectional view of 1D beam expander 38, in accordance with an embodiment of the invention. Beam expander 38 comprises a block 122 of optically transparent material, such as glass. Block 122 comprises a first face 124, a second face 126, a third face 128, and a fourth face 130, all perpendicular to the plane of FIG. 2, and all having rectangular shapes. Block 122 further comprises fifth and sixth faces (not shown) that are parallel to the plane of FIG. 2.

In this embodiment, first and second faces 124 and 126 are mutually parallel, as are third and fourth faces 128 and 130. A cross-section 132 of block 122, perpendicular to faces 124, 126, 128, and 130, is a parallelogram, and the block comprises a parallelepiped. (In optical nomenclature, a block of this shape is commonly termed, in deviation from the geometrical definition, a "rhomb" or a "rhomboid", even when the lengths of first and second faces 124 and 126 in the plane of the figure are different from those of third and fourth faces 128 and 130.)

Planar, partially-reflecting layers 134 extend within block 122 between third and fourth faces 128 and 130 in an orientation parallel to first and second faces 124 and 126. Partially-reflecting layers 134 commonly have a ratio of reflectance to transmittance (R/T-ratio) that is optimized to achieve uniform homogenization over the expanded beam. The R/T-ratio may be, for example, 50:50, 60:40, or any other ratio up to 90:10.

Beam expander 38 may in an alternative embodiment be designed to be used in conjunction with emitter array 34 comprising a polarized light source. In this case, the R/T-ratio for partially-reflecting layers 134 may be optimized for the specific polarization of the source.

Alternatively, when emitter array 34 comprises a non-polarized light source and a non-polarizing spatial modulator, such as a digital micro-mirror device (DMD), partially-reflecting layers 134 may be optimized for both s- and p-polarizations.

Block 122 is fabricated from component sub-blocks 122a-d, after coating partially-reflecting layers 134 over those faces of the sub-blocks that will become internal faces in the final assembled block. Partially-reflecting layers 134 typically comprise single or multi-layer thin films of dielectric and/or metallic materials.

An input beam 136 of width $W_{in}$, wherein $W_{in}$ is measured in the plane of the figure (i.e. the Y-Z-plane), impinges on third face 128. Input beam 136 is represented schematically by optical rays 138a-c. In the example shown in FIG. 1, input beam 136 is a narrow, collimated beam that is directed by collimation optics 36 into beam expander 38. A part of input beam 136, depicted by rays 138b-c, impinges on a partially-reflecting layer 134a. Another part of the beam, depicted by ray 138a, impinges on second face 126 at an angle of incidence $\theta_i$. After reflecting from second face 126 as a ray 140a, it impinges on a partially-reflecting layer 134a. Each time a ray impinges on one of partially-reflecting layers 134, it is split into child rays, which are transmitted and reflected rays, as is shown schematically in FIG. 2. After a number of reflections and transmissions, some of the children rays impinge on first face 124, as shown schematically by a ray 140b, and are reflected from the first face back into block 122. Rays that impinge on fourth face 130 exit as an expanded output beam 142 of width $W_{out}$ (in the plane of the figure, i.e., the Y-Z-plane), schematically represented by rays 144.

To ensure the homogeneity of output beam 142, it is important that the rays of input beam 136 undergo a large number of reflections from partially-reflecting layers 134. For this reason, the spacing h between adjacent partially-reflecting layers, as well as the spacing between the partially-reflecting layers and faces 124 and 126, is typically much smaller than the length L of first and second faces 124 and 126. For example, the ratio of L to h may advantageously be between 3 and 20, although other ratios may be used.

Furthermore, in order to ensure sufficient expansion of input beam 136, i.e., a high ratio of $W_{out}$:$W_{in}$, the height H of block 122, meaning the distance between the first and second faces, is advantageously made much larger than $W_{in}$. A typical ratio of H:$W_{in}$ is between 3 and 10, although other ratios may be used.

The spacings between adjacent partially-reflecting layers 134, such as h in FIG. 2, may be either equal or unequal. Depending on the ratio of L:h, partially-reflecting layers 134 may or may not extend all the way through block 122 from third face 128 to fourth face 130. Specifically, a high L:h ratio allows partially-reflecting layers 134 not to extend all the way through block 122.

As each ray is split at each partially-reflecting layer 134, the optical flux carried by the split rays is reduced, as shown schematically by the thickness of the rays in FIG. 2. For the sake of clarity, not all rays that are produced by reflections and transmissions from initial rays 138a-c are shown in FIG. 2.

Third and fourth faces 128 and 130 are desirably coated with an anti-reflective coating in order to reduce reflection losses of beams entering into and exiting from beam expander 38. First and second faces 124 and 126 may be left uncoated, provided that the angle of incidence $\theta_i$ exceeds the critical angle $\theta_c$ for TIR. For cases in which e does not exceed the critical angle $\theta_c$ (and optionally, even when e exceeds the critical angle), first and second faces 124 and 126 may be coated with a reflective coating, such as aluminum. Anti-reflective coatings and reflective coatings may be similarly applied in the embodiments described below.

Figure 3:
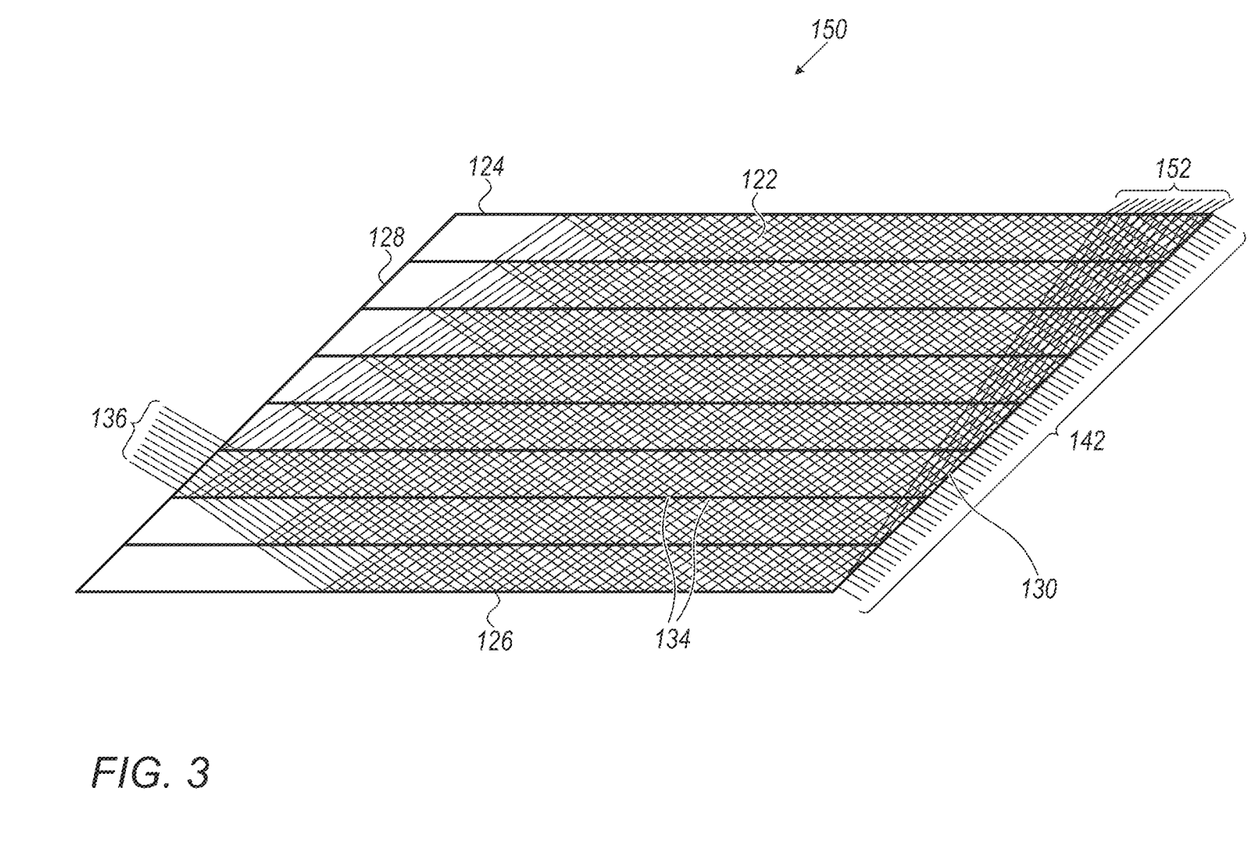

FIG. 3 is a schematic sectional view of a beam expander 150, in accordance with another embodiment of the invention. Beam expander 150 is similar to beam expander 38, and the same labels are used for both beam expanders. In FIG. 3, input beam 136 is represented by ten rays, whose splits into child rays within beam expander 150 are all shown. In addition to output beam 142, FIG. 3 also shows a second output beam 152 exiting through first face 124, due to rays within block 122 that have been reflected by TIR on fourth face 130. In FIG. 3, as well as in subsequent FIGS. 4, 5, and 6A-6F, the illustrated ray paths are the results of a simulation by an optical ray trace program.

Figure 4:
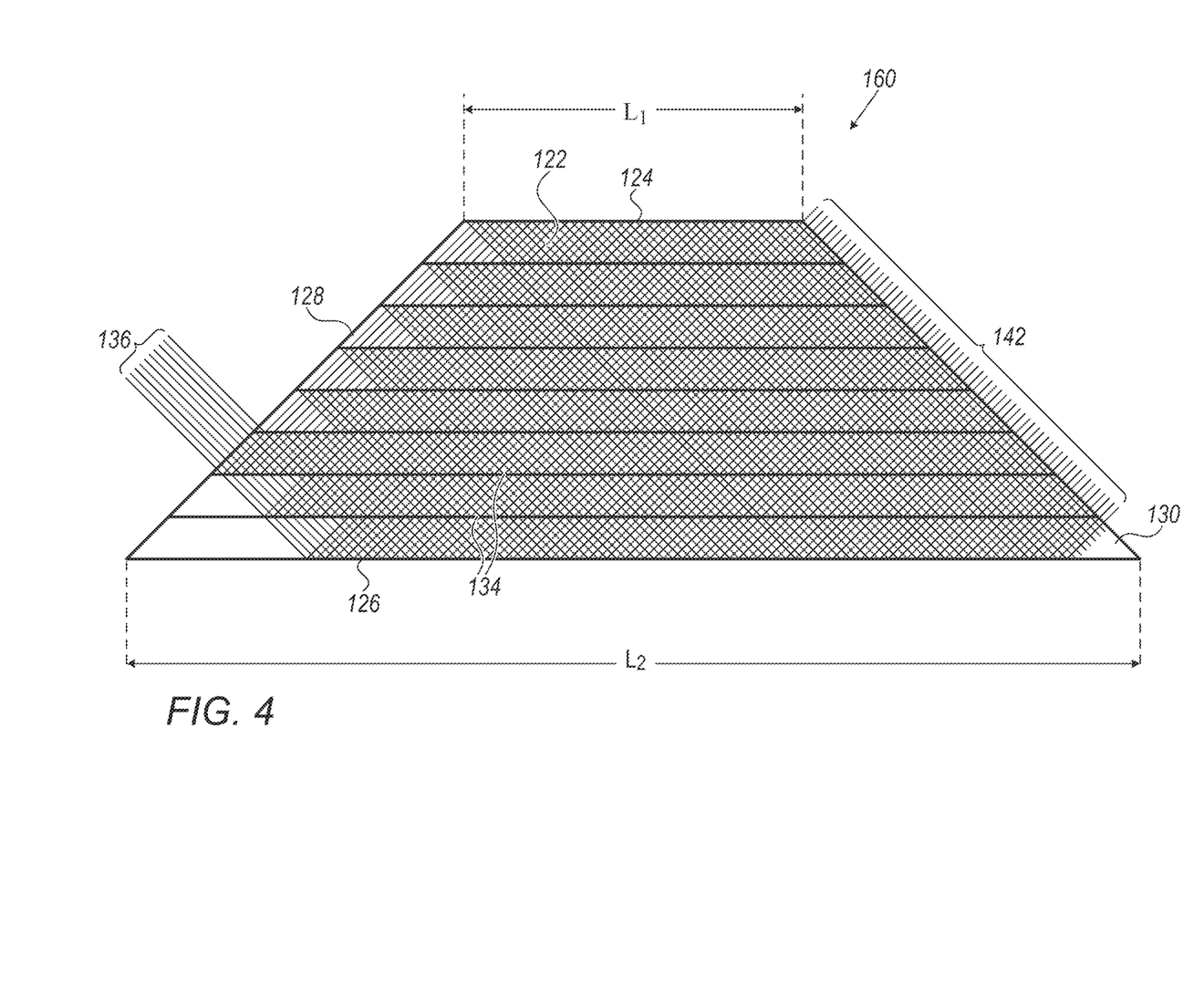

FIG. 4 is a schematic sectional view of a beam expander 160, in accordance with yet another embodiment of the invention. The cross-section of beam expander 160 is an isosceles trapezoid. However, both functionally and in terms of its parts, beam expander 160 is similar to beam expander 150, and the same labels as in beam expander 150 are used to denote its parts (except that in beam expander 160, the sub-blocks making up block 122 are of unequal sizes). The different tilt of fourth face 130, as compared to beam expander 150, causes output beam 142 to exit at a different angle. The lengths of first face 124 and the second face 126 in the plane of FIG. 4, $L_1$ and $L_2$, respectively, are now unequal. In optical nomenclature, a prism of this shape is commonly termed a "Dove-prism."

Figure 5:
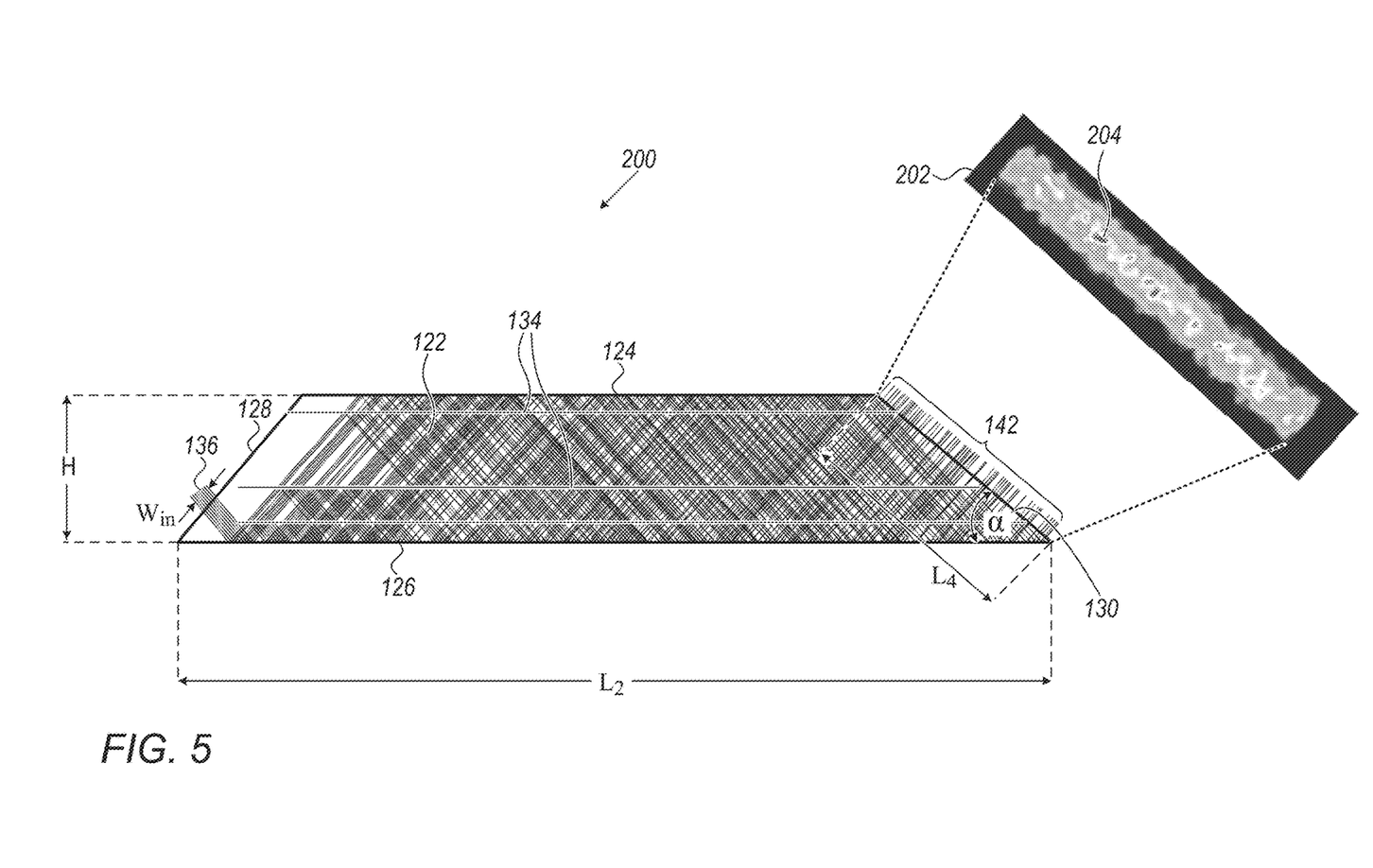

FIG. 5 is a schematic sectional view of a beam expander 200, in accordance with still another embodiment of the invention. Like beam expander 160, beam expander 200 has the shape of a Dove prism. In the present embodiment, the length $L_2$ of second face 126 is 90 mm, the length $L_4$ of fourth face 130 is 12 mm, the angle α between the fourth face and the second face is 40 degrees, and the width $W_{in}$ of input beam 136 is 1 mm. All of the dimensions of beam expander 200 may be varied according to performance requirements. The 40 degree angle is selected in order to maintain a total-internal-reflection state for the rays propagating down the axis of the Dove prism.

In this example, the aspect ratio $L_2$:H is about 10. Alternatively, the aspect ratio may vary between 5 and 15, or may assume even larger or smaller values. Due to the high aspect ratio $L_2$:H of the illustrated embodiment, a large number of internal reflections, and hence ray splittings and generations of child rays, are achieved even with the relatively low number of three partially-reflecting layers 134 in beam expander 160. Partially-reflecting layers 134 do not extend all the way to third and fourth faces 128 and 130. Partially-reflecting layers 134 are located at unequal spacings from each other, as well as from first and second faces 124 and 126.

An inset 202 shows a simulated spatial distribution 204 of the irradiance of exit beam 42 in the plane of fourth face 130. Distribution 204 shows a high degree of homogeneity (uniformity) of output beam 142, as well as the large extent its 1D expansion.

FIGS. 6A-6F are schematic illustrations of ray paths in beam expander 200 for various angles of incidence, along with the associated spatial irradiance distributions of output beam 142, in accordance with an embodiment of the invention.

Each of the six FIGS. 6A-6F shows in its upper part beam expander 200 with simulated rays, and in its lower part an inset 202 containing simulated spatial distribution 204 of the irradiance of exit beam 142 in the plane of fourth face 130, as in FIG. 5. For the sake of clarity, only some of the labels are marked in FIG. 6A, and no labels are marked in FIGS. 6B-6F. The text above beam expander 200 in each of the six figures indicates the angle of incidence of input beam 136, wherein the angle is taken as positive in a counter-clockwise direction from a normal to third face 128. These angles may represent the expanded range of angles for light reflected from scanning mirror 40 in FIG. 1. Below inset 202, in each of the six figures, the efficiency of beam expander 200 for the respective input beam is noted, meaning the ratio between the total optical flux of output beam 142 and the total flux of input beam 136.

Figure 6A:
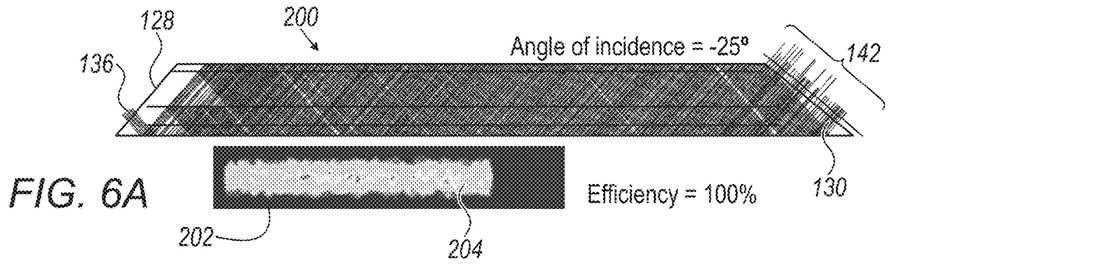
FIGS. 6A, 6B, 6C, 6D, 6E and 6F are schematic illustrations of ray paths in a beam expander for various angles of incidence, along with associated spatial irradiance distributions of an output beam from the beam expander, in accordance with an embodiment of the invention.
Figure 6B:
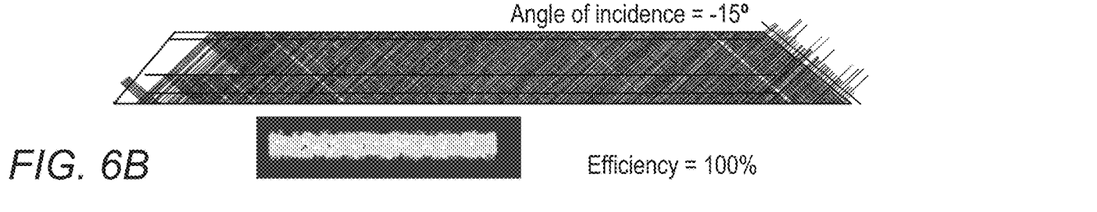
Figure 6C:
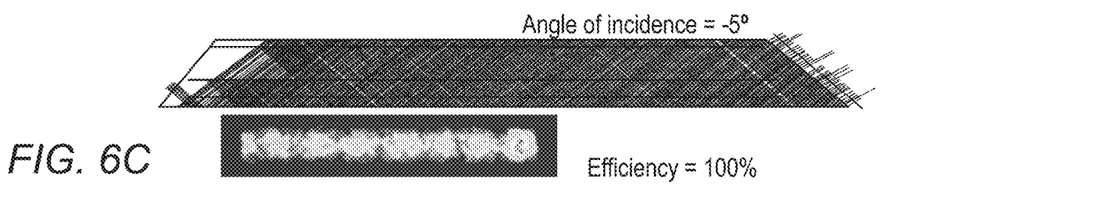
Figure 6D:
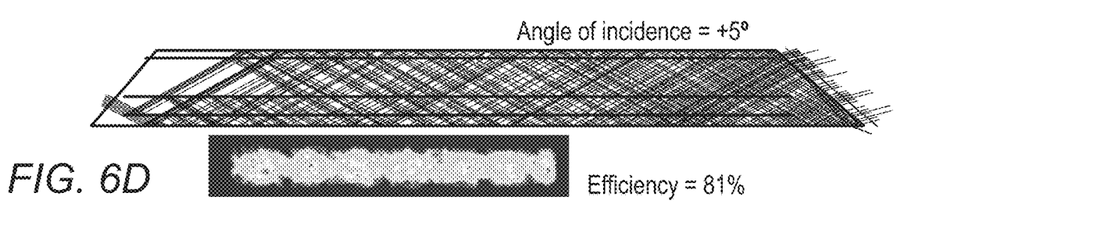
Figure 6E:
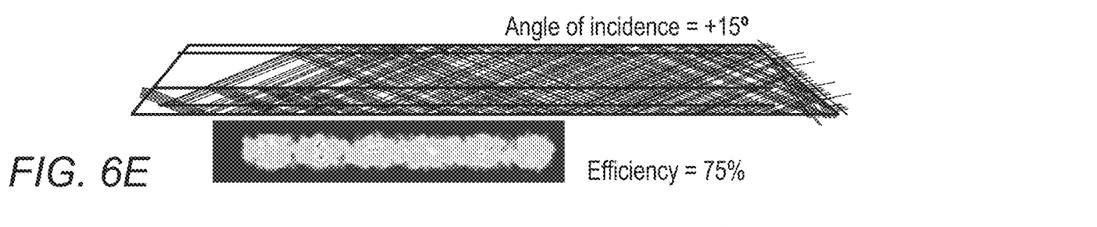
Figure 6F:
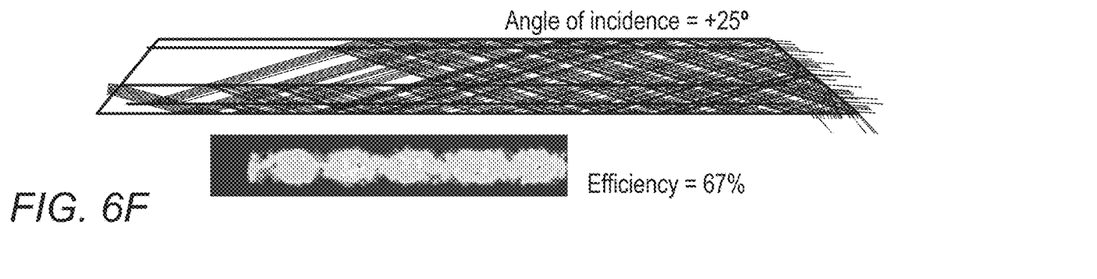

A high degree of uniformity and an efficiency of 100%, is observed for angles of incidence of −25 degrees and −15 degrees (FIGS. 6A-6B). However, at a −5 degree angle of incidence (FIG. 6C) the efficiency is 100%, but the uniformity has deteriorated significantly. At higher angles of incidence (+5 degrees and above), the uniformity improves, but efficiency decreases to 81%, 75% and 67% for angles of +5 degrees (FIG. 6D), +15 degrees (FIG. 6E), and +25 degrees (FIG. 6F), respectively. The decreased efficiency results from a leakage of rays through other faces than fourth face 130, as shown in the respective figures. For angles of incidence that are +5 degrees and above, the efficiency can be increased by orienting fourth face 130 at a steeper angle with respect to first and second faces 124 and 126.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optical component, comprising:
a block of a transparent material, having a trapezoidal cross-section defined by first and second parallel, rectangular faces on mutually-opposing sides of the block and third and fourth faces oriented diagonally at opposing ends of the first and second faces; and
one or more planar, partially-reflecting layers extending within the block between the third and fourth faces in an orientation parallel to the first and second faces.

2. The optical component according to claim 1, wherein the trapezoidal cross-section comprises a parallelogram.

3. The optical component according to claim 1, wherein the trapezoidal cross-section comprises an isosceles trapezoid.

4. The optical component according to claim 1, and comprising an anti-reflective coating on the third and fourth faces.

5. The optical component according to claim 1, wherein the first and second faces are configured to reflect internally rays of light that impinge on the first and second faces after passing through the partially-reflecting layers.

6. The optical component according to claim 5, and comprising a reflective coating on the first and second faces.

7. The optical component according to claim 1, wherein the one or more planar, partially-reflecting layers comprise multiple planar, partially-reflecting layers, which are parallel to and spaced apart between the first and second faces.

8. The optical component according to claim 6, wherein a spacing between the partially-reflecting layers does not exceed one-fifth of a length of the second face.

9. The optical component according to claim 1, wherein a height of the block between the first and second faces does not exceed one fifth of a length of the second face.

10. Image projection apparatus, comprising:
an optical pupil expander, comprising:
a block of a transparent material, having a trapezoidal cross-section defined by first and second parallel, rectangular faces on mutually-opposing sides of the block and third and fourth faces oriented diagonally at opposing ends of the first and second faces; and
one or more planar, partially-reflecting layers extending within the block between the third and fourth faces in an orientation parallel to the first and second faces; and
an image projector, which is configured to project a beam of light onto the third face of the block with a given input beam width, at an angle selected so that the beam is reflected internally within the block while being partially reflected and partially transmitted multiple times by the one or more planar, partially-reflecting layer, and exits through the fourth face with an output beam width at least twice the input beam width.

11. The apparatus according to claim 10, wherein the optical pupil expander is configured to homogenize an intensity of the light in the output beam.

12. The apparatus according to claim 10, wherein the angle is selected so that the beam is reflected from the first and second faces of the block by total internal reflection.

13. A method for image projection, comprising:
providing an optical pupil expander, comprising:
   a block of a transparent material, having a trapezoidal cross-section defined by first and second parallel, rectangular faces on mutually-opposing sides of the block and third and fourth faces oriented diagonally at opposing ends of the first and second faces; and
   one or more planar, partially-reflecting layers extending within the block between the third and fourth faces in an orientation parallel to the first and second faces; and
projecting a beam of light onto the third face of the block with a given input beam width, at an angle selected so that the beam is reflected internally within the block while being partially reflected and partially transmitted multiple times by the one or more planar, partially-reflecting layer, and exits through the fourth face with an output beam width at least twice the input beam width.

14. The method according to claim 13, wherein projecting the beam of light comprises homogenizing an intensity of the light in the output beam.

15. The method according to claim 13, wherein projecting the beam of light comprises selecting the angle so that the beam is reflected from the first and second faces of the block by total internal reflection.

16. The method according to claim 13, wherein the trapezoidal cross-section comprises a parallelogram.

17. The method according to claim 13, wherein the trapezoidal cross-section comprises an isosceles trapezoid.

18. The method according to claim 13, wherein the one or more planar, partially-reflecting layers comprise multiple planar, partially-reflecting layers, which are parallel to and spaced apart between the first and second faces, wherein a spacing between the partially-reflecting layers does not exceed one-fifth of a length of the second face.

19. The method according to claim 13, wherein a height of the block between the first and second faces does not exceed one fifth of a length of the second face.

20. The method according to claim 13, wherein providing the optical pupil expander comprises providing a plurality of sub-blocks of the transparent material, coating a surface of at least one of the sub-blocks with the one or more planar, partially-reflecting layers, and cementing the sub-blocks together to form the block of the transparent material.

\* \* \* \* \*